(12) United States Patent
Takizawa et al.

(10) Patent No.: US 11,169,310 B2
(45) Date of Patent: Nov. 9, 2021

(54) OPTICAL ELEMENT AND OPTICAL DEVICE

(71) Applicant: HAMAMATSU PHOTONICS K.K., Hamamatsu (JP)

(72) Inventors: Kuniharu Takizawa, Hamamatsu (JP); Hiroshi Tanaka, Hamamatsu (JP); Haruyoshi Toyoda, Hamamatsu (JP); Yasushi Ohbayashi, Hamamatsu (JP); Hiroto Sakai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 25 days.

(21) Appl. No.: 16/307,518

(22) PCT Filed: Jun. 5, 2017

(86) PCT No.: PCT/JP2017/020873
§ 371 (c)(1),
(2) Date: Dec. 6, 2018

(87) PCT Pub. No.: WO2017/213101
PCT Pub. Date: Dec. 14, 2017

(65) Prior Publication Data
US 2019/0154897 A1    May 23, 2019

(30) Foreign Application Priority Data

Jun. 6, 2016 (JP) .............................. JP2016-112850
Jun. 6, 2016 (JP) .............................. JP2016-112852
Jun. 6, 2016 (JP) .............................. JP2016-112854

(51) Int. Cl.
*G02F 1/03* (2006.01)
*G02F 1/29* (2006.01)
(Continued)

(52) U.S. Cl.
CPC ........... *G02B 5/3025* (2013.01); *G01N 21/17* (2013.01); *G02F 1/03* (2013.01); *G02F 1/0311* (2013.01); *G02F 1/0316* (2013.01)

(58) Field of Classification Search
CPC ...... H04N 9/3197; B82Y 20/00; G02B 26/00; G02F 1/03; G02F 1/0316; G02F 1/0123; G02F 1/0322; G02F 1/29; G02F 1/0356
(Continued)

(56) References Cited

U.S. PATENT DOCUMENTS 3,938,878 A    2/1976 Fox
5,221,989 A    6/1993 Stappaerts et al.
(Continued)

FOREIGN PATENT DOCUMENTS

CN    1825579 A    8/2006
CN    101281301 A    10/2008
(Continued)

OTHER PUBLICATIONS

International Preliminary Report on Patentability dated Dec. 20, 2018 for PCT/JP2017/020869.
(Continued)

*Primary Examiner* — Dawayne Pinkney
(74) *Attorney, Agent, or Firm* — Faegre Drinker Biddle & Reath LLP

(57) ABSTRACT

An optical element includes an electro-optic crystal having an isotropic crystal which belongs to a point group m3m of a cubic system and including an input surface to which input light is input and a rear surface which is a surface on the opposite side of the input surface; a first electrode disposed on the input surface; and a second electrode disposed on the rear surface. The input surface is located along at least one axis between axes obtained by rotating two crystal axes about one remaining crystal axis used as a rotation center at
(Continued)

a predetermined angle in three crystal axes of the electro-optic crystal. A direction of an electric field to be induced by a voltage applied to a part between the first electrode and the second electrode is set in a propagation direction of the input light.

9 Claims, 12 Drawing Sheets

(51) Int. Cl.
*G02F 1/00* (2006.01)
*G02B 5/30* (2006.01)
*G01N 21/17* (2006.01)

(58) Field of Classification Search
USPC ........ 359/245–247, 254–255, 259, 315, 238, 359/321, 322
See application file for complete search history.

(56) References Cited

U.S. PATENT DOCUMENTS

| 5,291,314 | A | * | 3/1994 | Agranat | G02F 1/21 |
| | | | | | 359/11 |
| 5,497,258 | A | | 3/1996 | Ju et al. | |
| 6,211,991 | B1 | | 4/2001 | Bryan | |
| 6,525,867 | B1 | | 2/2003 | Oakley et al. | |
| 6,950,584 | B1 | | 9/2005 | Suzuki | |
| 2003/0197273 | A1 | | 10/2003 | Dennison et al. | |
| 2004/0008397 | A1 | | 1/2004 | Noonan | |
| 2005/0152024 | A1 | | 7/2005 | Awaya et al. | |
| 2006/0070715 | A1 | | 4/2006 | Connors, Jr. et al. | |
| 2010/0001371 | A1 | | 1/2010 | Suzuki et al. | |
| 2010/0166464 | A1 | * | 7/2010 | Cho | G02B 26/105 |
| | | | | | 399/221 |
| 2010/0244632 | A1 | | 9/2010 | Maekawa et al. | |
| 2011/0170160 | A1 | | 7/2011 | Park et al. | |
| 2011/0255148 | A1 | | 10/2011 | Ohta et al. | |
| 2013/0057953 | A1 | | 3/2013 | Yokoi | |
| 2018/0276843 | A1 | | 9/2018 | Send et al. | |

FOREIGN PATENT DOCUMENTS

| CN | 101316790 A | 12/2008 |
| CN | 102096206 A | 6/2011 |
| CN | 103605217 A | 2/2014 |
| CN | 105527733 A | 4/2016 |
| JP | S53-3841 A | 1/1978 |
| JP | S63-038916 A | 2/1988 |
| JP | H5-224165 A | 9/1993 |
| JP | H09-502813 A | 3/1997 |
| JP | 2005-234541 A | 9/2005 |
| JP | 2006-65037 A | 3/2006 |
| JP | 2010-19630 A | 1/2010 |
| JP | 2010-224003 A | 10/2010 |
| JP | 2014-89340 A | 5/2014 |
| JP | 2014-89341 A | 5/2014 |
| JP | 2014-202786 A | 10/2014 |
| JP | 2014-219495 A | 11/2014 |
| JP | 2015-158531 A | 9/2015 |
| WO | WO-95/06272 A1 | 3/1995 |
| WO | WO 2006/007071 A1 | 1/2006 |

OTHER PUBLICATIONS

International Preliminary Report on Patentability dated Dec. 20, 2018 for PCT/JP2017/020870.
International Preliminary Report on Patentability dated Dec. 20, 2018 for PCT/JP2017/020873.
International Preliminary Report on Patentability dated Dec. 20, 2018 for PCT/JP2017/020871.
U.S. Office Action dated Dec. 21, 2020 issued in U.S. Appl. No. 16/307,511, including double-patenting rejection based on U.S. Appl. No. 16/769,321 and U.S. Appl. No. 16/769,327.

* cited by examiner

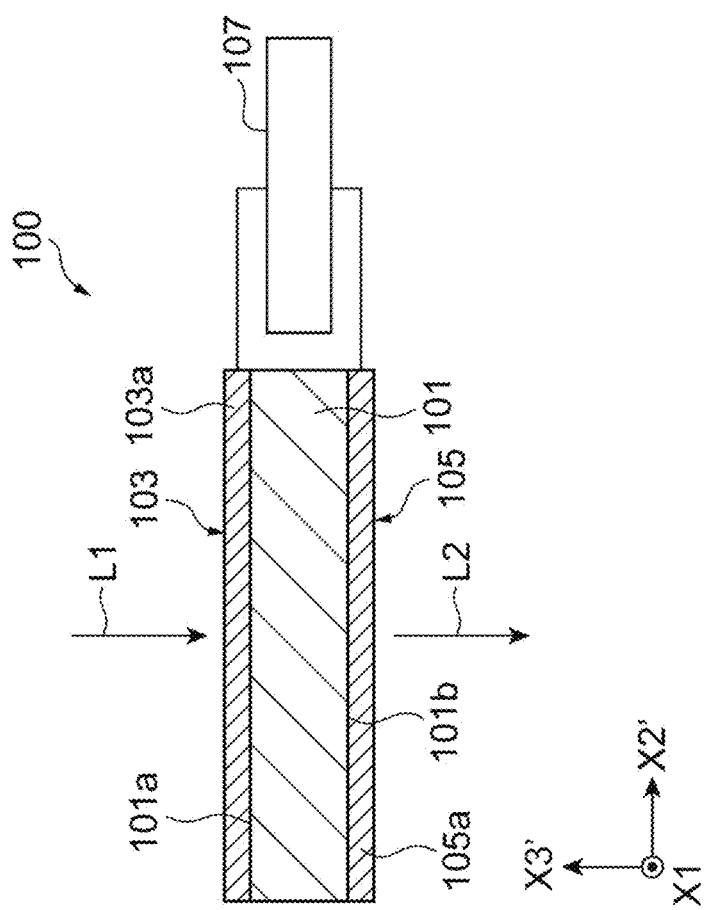
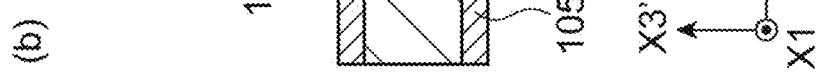
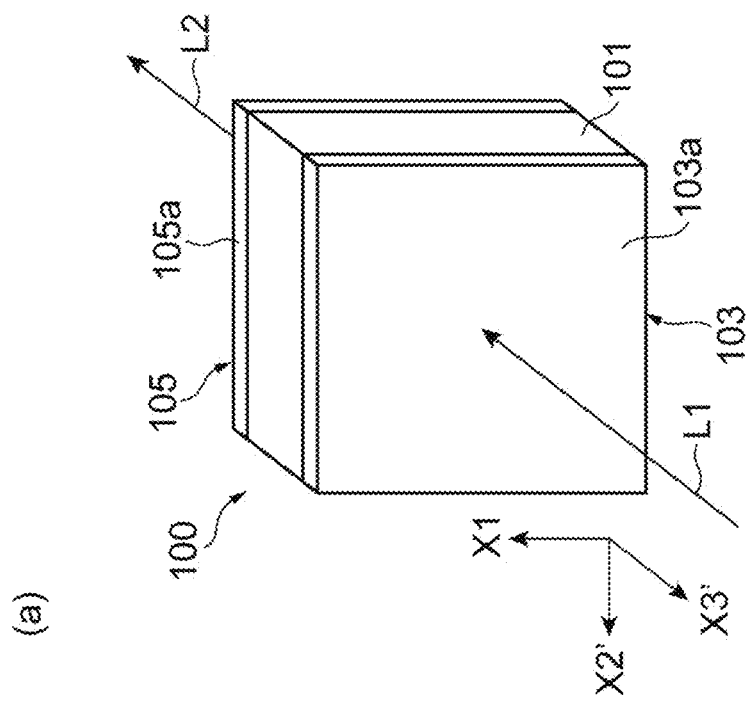

Fig.2
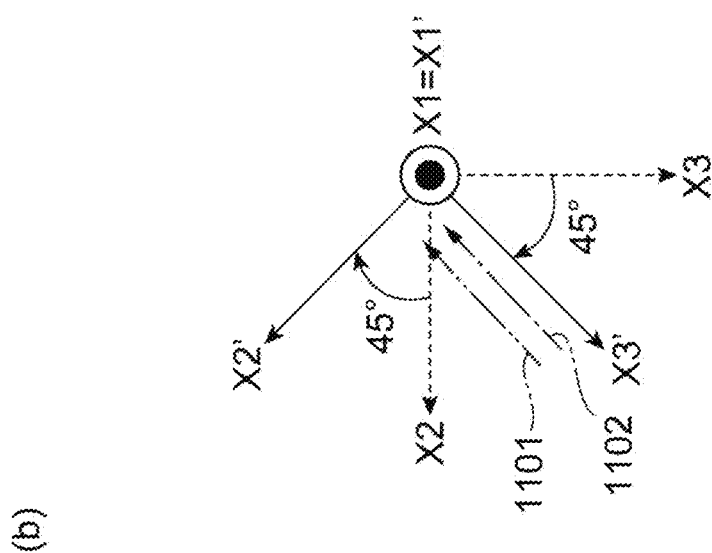
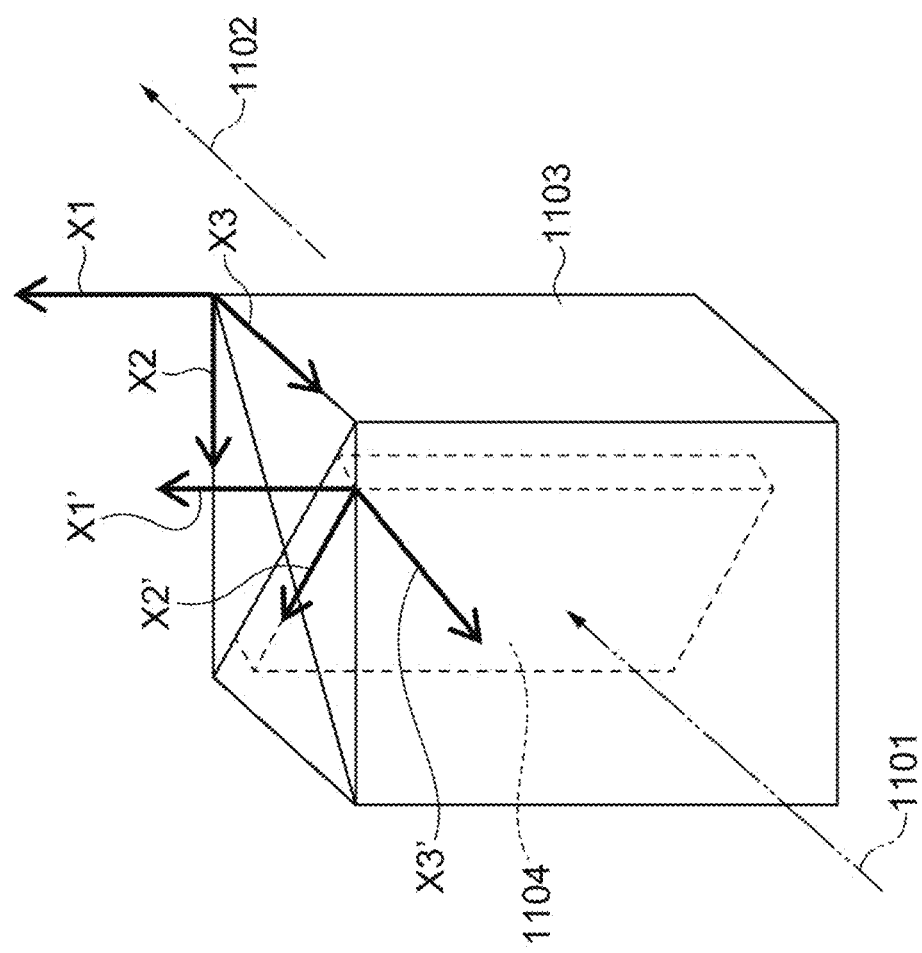

Fig. 5
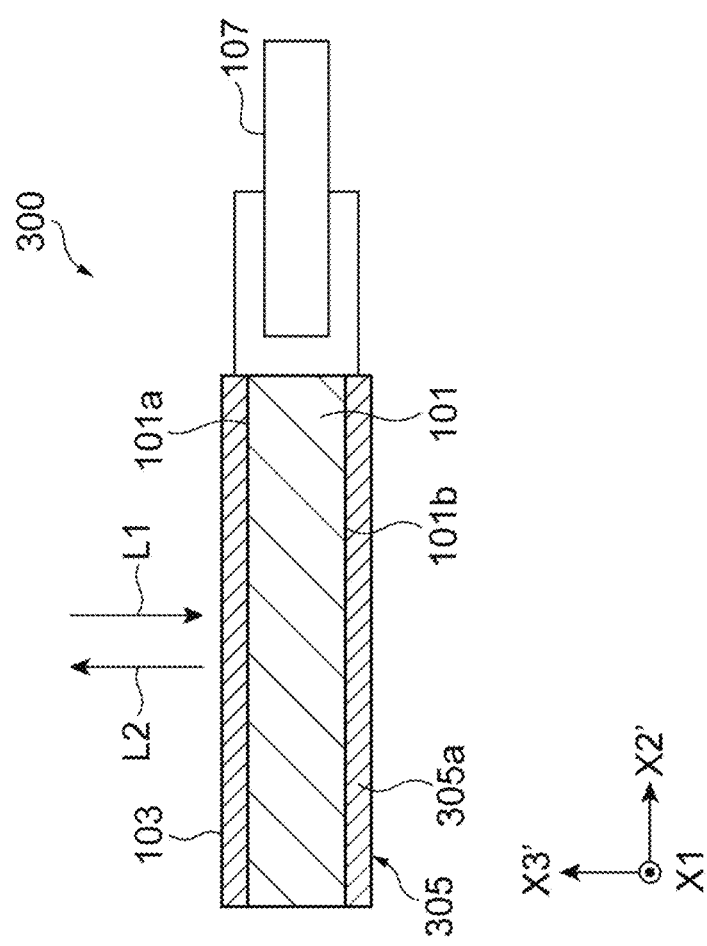
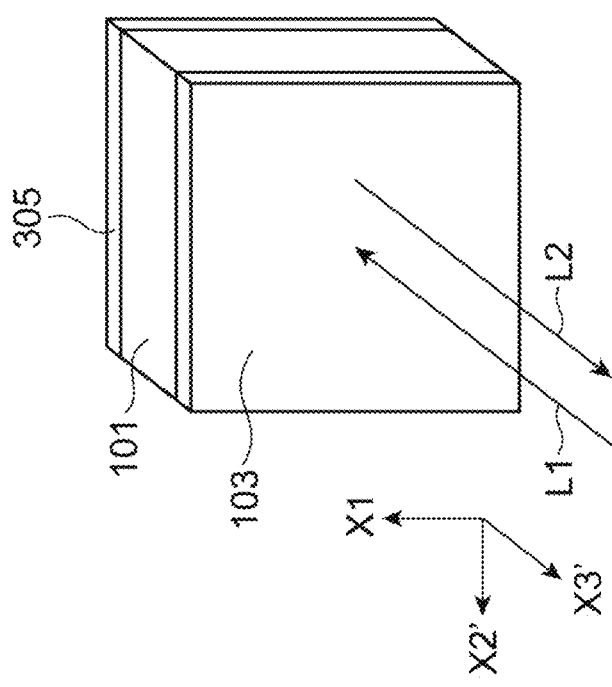

Fig.6
(a)
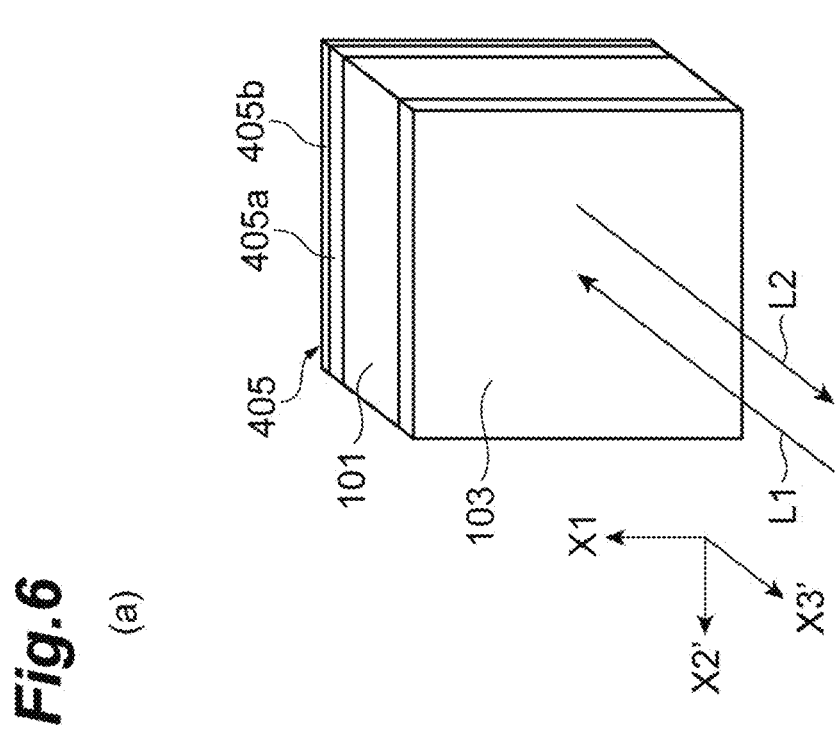
(b)
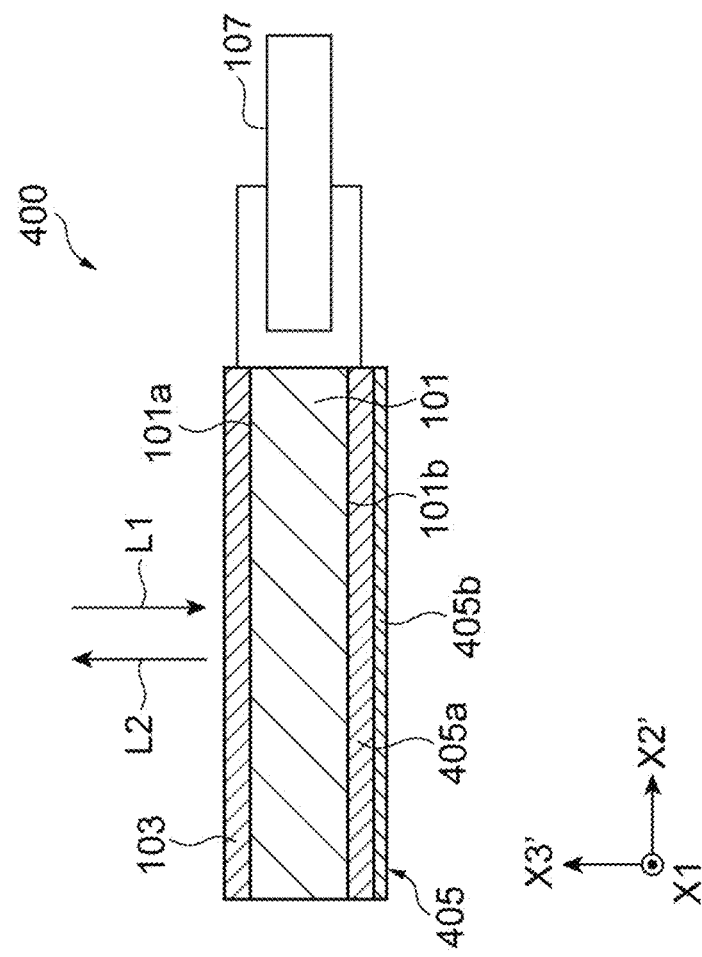

Fig.8
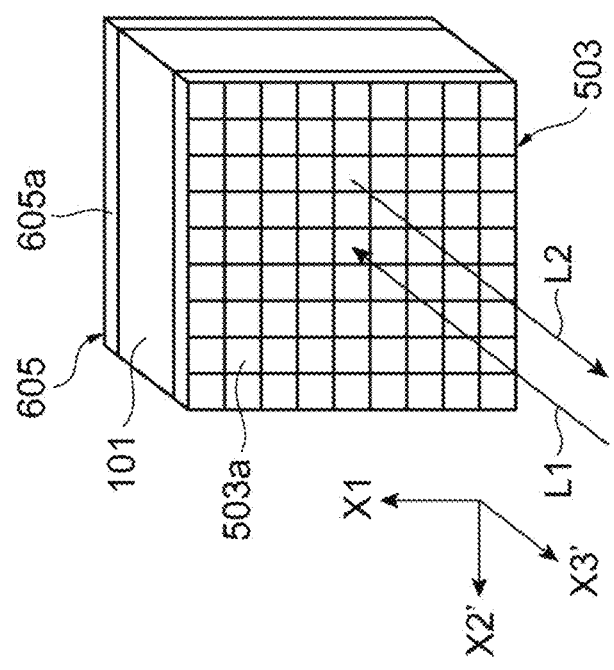
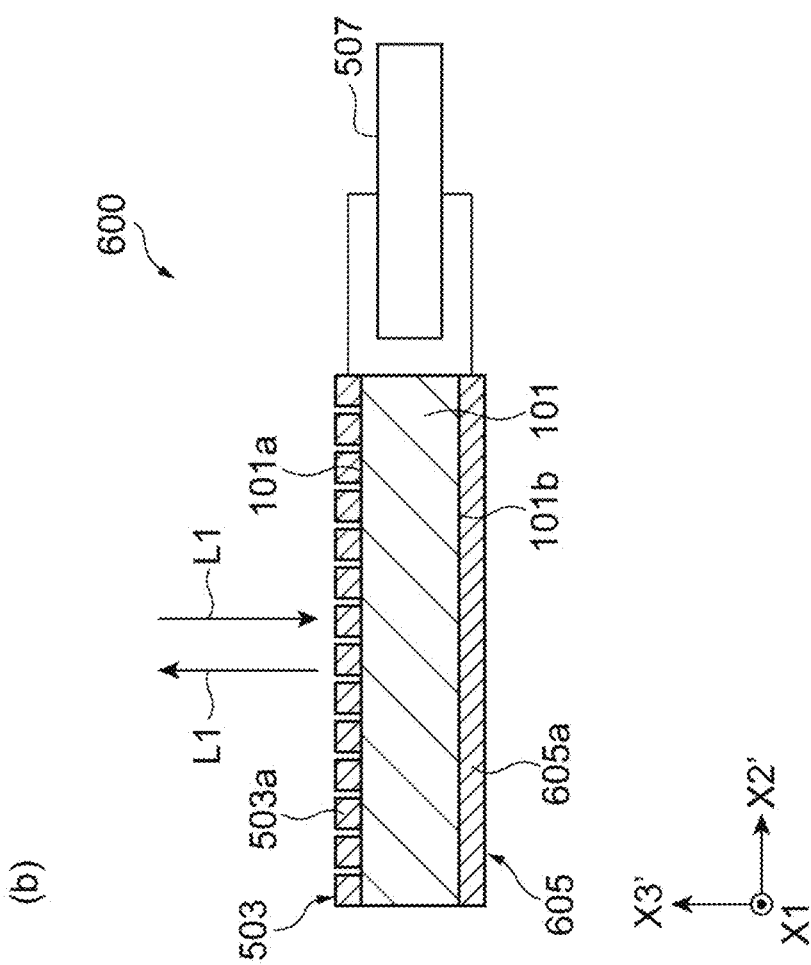

Fig. 9
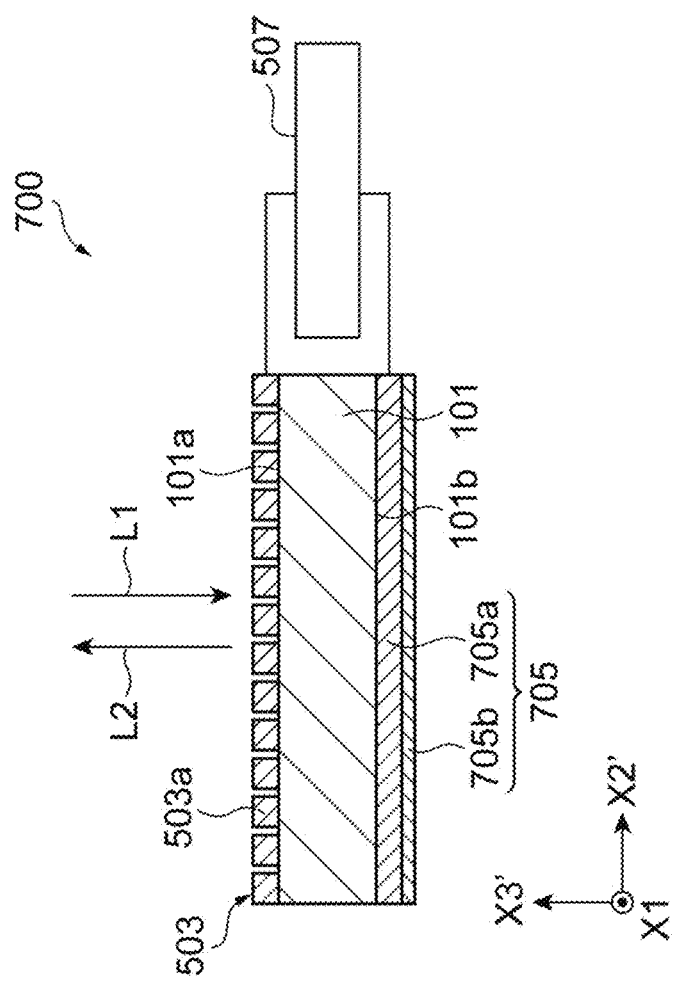
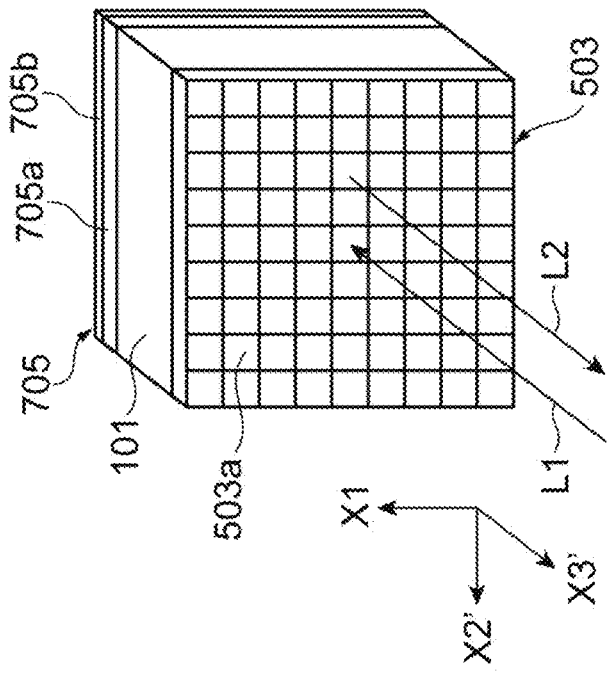

OPTICAL ELEMENT AND OPTICAL DEVICE

TECHNICAL FIELD

The present disclosure relates to an optical element and an optical device.

BACKGROUND ART

For example, Patent Literature 1 and Patent Literature 2 disclose electro-optical devices. These electro-optical devices include a substrate, a layer of $KTa_{1-x}Nb_xO_3$ (KTN) that is laminated on the substrate and is formed of a ferroelectric substance, a transparent electrode that is disposed on a front surface of the KTN layer, and a metal electrode that is disposed on a rear surface of the KTN layer. KTN has four crystal structures depending on a temperature and is utilized as an electro-optical device when adopting a perovskite-type crystal structure.

CITATION LIST

Patent Literature

Patent Literature 1: Japanese Unexamined Patent Publication No. 2014-89340
Patent Literature 2: Japanese Unexamined Patent Publication No. 2014-89341

SUMMARY OF INVENTION

Technical Problem

An isotropic crystal, such as KTN, which belongs to a point group m3m of a cubic system is a ferroelectric crystal and does not exhibit a Pockets effect, a piezoelectric effect, and a converse voltage effect. That is, even if an electric field is applied to such a crystal, there is no change proportional to the electric field in a refractive index or a crystal length of the crystal. Therefore, when such a crystal is in practical application of light modulation or light control, a Kerr effect, in which the refractive index changes in proportion to the square of an applied electric field, has been used. For example, retardation (phase difference) of light can be controlled by applied electric fields to be orthogonal to a propagation direction of light. However, it is difficult to control retardation of light by applied electric fields in the propagation direction of light.

An object of an embodiment is to provide an optical element which controls retardation of linear polarization components of input light orthogonal to each other using an isotropic crystal which belongs to the point group m3m of the cubic system.

Solution to Problem

According to an aspect, there is provided an optical element for controlling retardation of linear polarization components in input light orthogonal to each other. The optical element includes an electro-optic crystal having an isotropic crystal which belongs to a point group m3m of a cubic system and including an input surface to which the input light is input and a rear surface which is a surface on the opposite side of the input surface; a first electrode disposed on the input surface; and a second electrode disposed on the rear surface. The input surface is located along at least one axis between axes obtained by rotating two crystal axes about one remaining crystal axis used as a rotation center at a predetermined angle in three crystal axes of the electro-optic crystal. A direction of an electric field to be induced by voltage applied to a part between the first electrode and the second electrode is set in a propagation direction of the input light inside the electro-optic crystal.

In this optical element, in the electro-optic crystal that is an isotropic crystal which belongs to the point group m3m of the cubic system, two arbitrary axes are rotated at an arbitrary angle about the remaining crystal axis. Since the input surface is located along at least one axis between the two arbitrary axes, input light is input in a manner of being parallel or perpendicular to the two arbitrary axes. Accordingly, retardation of linear polarization components of input light orthogonal to each other is controlled by utilizing the Kerr effect.

In addition, according to the aspect, the predetermined angle may be an angle within a range of 40 degrees to 50 degrees. Particularly, the predetermined angle may be 45 degrees. When the rotation angle of the crystal axes is within a range of 40 degrees to 50 degrees, which is close to 45 degrees, control is efficiently performed.

In addition, according to the aspect, the electro-optic crystal may be a crystal of $KTa_{1-x}Nb_xO_3$ ($0 \leq x \leq 1$) or a crystal of $K_{1-y}Li_yTa_{1-x}Nb_xO_3$ ($0 \leq x \leq 1$ and $0 < y < 1$). According to this configuration, an electro-optic crystal having a high relative permittivity may be easily realized.

In addition, according to the aspect, the optical element may be a wavelength plate, a light modulator, a spatial light modulator, a display element, or a compensator further including a drive circuit configured to apply an electric field to a part between the first electrode and the second electrode. Such an optical element may be manufactured without requiring high processing accuracy as in the related art. In addition, it is possible to cope with a wide wavelength range by changing an electric field to be applied.

In addition, according to another aspect, there is provided an optical device in which the plurality of optical elements is arrayed on an optical path of the input light. The optical device may include a drive circuit configured to apply an electric field to a part between the first electrode and the second electrode with respect to each of the plurality of optical elements, and a plurality of polarizers disposed on each of the input surface side and the rear surface side of the plurality of optical elements. According to this optical device, for example, it is possible to simply constitute an optical filter having a function similar to that of a LYOT filter.

Effects of Invention

According to the embodiments, it is possible to provide an optical element which can control retardation of linear polarization components of input light orthogonal to each other using an isotropic crystal which belongs to a point group m3m of a cubic system.

BRIEF DESCRIPTION OF DRAWINGS

FIG. 1 is a schematic view illustrating a wavelength plate according to an embodiment.

FIG. 2 is a view illustrating a relationship among crystal axes of an electro-optic crystal, a traveling direction of light, and an orientation of an electric field when performing retardation modulation.

FIG. 5 is a schematic view illustrating a wavelength plate according to further another embodiment.

FIG. 6 is a schematic view illustrating a wavelength plate according to still another embodiment.

FIG. 8 is a schematic view illustrating a spatial light modulator according to another embodiment.

FIG. 9 is a schematic view illustrating a spatial light modulator according to further another embodiment.

DESCRIPTION OF EMBODIMENTS

Figure 3:
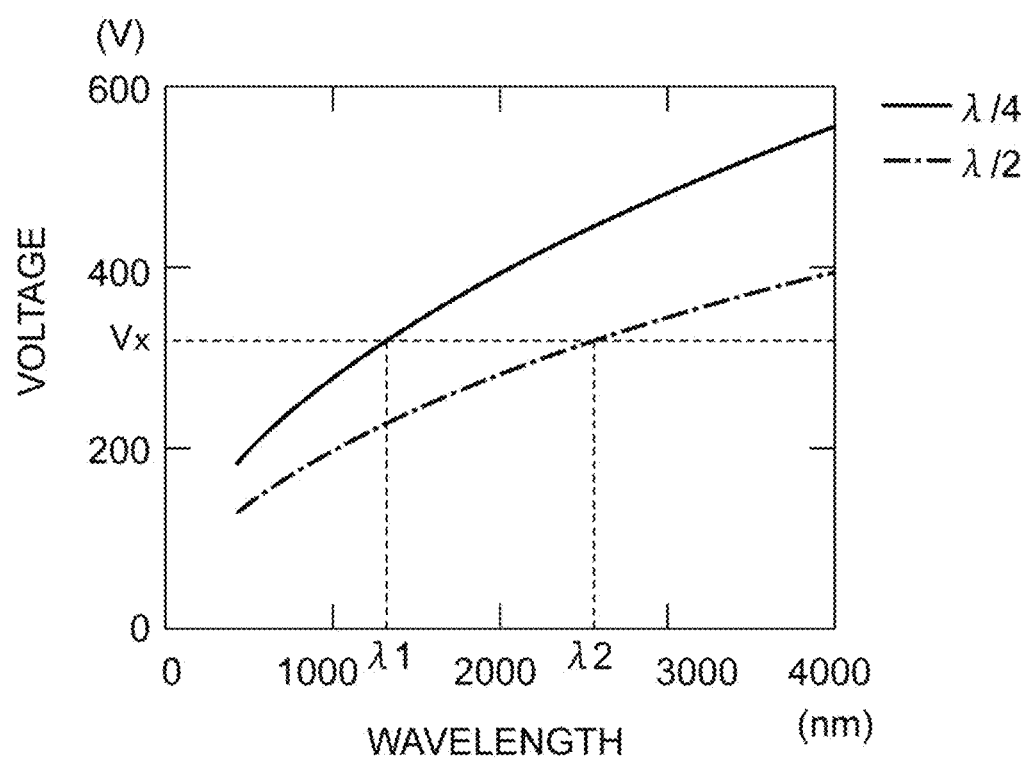
FIG. 3 is a graph illustrating a relationship between applying voltages and a wavelength in the wavelength plate according to the embodiment.

Hereinafter, embodiments will be described in detail with reference to the drawings. For convenience, there are cases in which the same reference signs are applied to substantially the same elements and description thereof will be omitted. In each of the following embodiments, an optical element and an optical device, which uses an electro-optic crystal to control retardation of linear polarization components of light that has been input (input light) orthogonal to each other, will be described.

First Embodiment

In the present embodiment, as an example of an optical element, a wavelength plate will be described. FIG. 1(a) is a perspective view schematically illustrating a wavelength plate. FIG. 1(b) is a cross-sectional view schematically illustrating the wavelength plate. A wavelength plate 100 includes an electro-optic crystal 101, a first electrode 103, a second electrode 105, and a drive circuit 107.

The electro-optic crystal 101 has a plate shape including an input surface 101a to which input light L1 is input and a rear surface 101b which is a surface on the opposite side of the input surface 101a. The electro-optic crystal 101 has a perovskite-type crystal structure and is an isotropic crystal which belongs to a point group m3m of a cubic system. For example, the electro-optic crystal 101 has a relative permittivity of 100 or higher. As an example, a value ranging from approximately 1,000 to 20,000 may be employed. Examples of such an electro-optic crystal 101 include a crystal of $KTa_{1-x}Nb_xO_3$ ($0 \le x \le 1$) (will hereinafter be referred to as a "KTN crystal"), a crystal of $K_{1-y}Li_yTa_{1-x}Nb_xO_3$ ($0 \le x \le 1$ and $0 < y < 1$), and a PLZT crystal. Specifically, examples thereof include $BaTiO_3$, $K_3Pb_3(Zn_2Nb_7)O_{27}$, $K(Ta_{0.65}Nb_{0.35})P_3$, $Pb_3MgNb_2O_9$, and $Pb_3NiNb_2O_9$.

In the wavelength plate 100 of the present embodiment, a KTN crystal is used as the electro-optic crystal 101. Since a KTN crystal belongs to the point group m3m of the cubic system, the KIN crystal has no Pockels effect and performs modulation of input light due to a Kerr effect. Therefore, retardation modulation is performed by rotating two arbitrary crystal axes about the remaining axis at an arbitrary angle other than 0 degrees and 90 degrees, that is, an angle greater than 0 degrees and smaller than 90 degrees. Phase modulation is performed by inputting light in a manner of being parallel or perpendicular to the crystal axes of the electro-optic crystal 101 and applying an electric field in the same direction.

FIG. 2(a) is a perspective view illustrating a relationship among crystal axes of an electro-optic crystal, a traveling direction of light, and an orientation of an electric field when performing retardation modulation of input light using the electro-optic crystal. FIG. 2(b) is a plan view illustrating each of the axes. Axes X1, X2, and X3, which are crystal axes of a uniaxial crystal, are obtained by an index ellipsoid of Expression (1).

[Math. 1]

$$\frac{X1^2}{n_o^2} + \frac{X2^2}{n_o^2} + \frac{X3^2}{n_e^2} = 1 \tag{1}$$

Here, $n_o$ is an ordinary ray refractive index, and $n_e$ is an extraordinary ray refractive index. In a uniaxial crystal, an X3-axis is referred to as an axis C to define the crystal axis. On the other hand, in a case of a crystal (isotropic crystal) which belongs to the point group m3m of the cubic system, when the refractive index of the crystal is $n_k$, the index ellipsoid is obtained by Expression (2).

[Math. 2]

$$\frac{X1^2}{n_k^2} + \frac{X2^2}{n_k^2} + \frac{X3^2}{n_k^2} = 1 \tag{2}$$

That is, the crystal axes are freely set. However, in such a crystal, as illustrated in FIG. 2(a), the crystal grows while maintaining the shape of a rectangular parallelepiped. Therefore, generally, directions of three normal vectors on six surfaces constituting a rectangular parallelepiped are set as the axes X1, X2, and X3.

When performing retardation modulation of input light using an electro-optic crystal, an input surface of the electro-optic crystal is located along at least one axis of new axes obtained by rotating two crystal axes about one remaining crystal axis used as a rotation center at a predetermined angle in three crystal axes of the electro-optic crystal. That is, an input surface coincides with a plane including one crystal axis (rotation center) and one axis of the new axes. As an example, the rotation angle of the crystal axes is an angle within a range of 40 degrees to 50 degrees.

The example in FIG. 2 illustrates a case in in which a crystal (crystal axes) is rotated at an angle of 45 degrees. In the present embodiment, axes obtained by rotating the axes X2 and X3 45 degrees about the axis X1 (crystal axis) are set as new axes X1', X2', and X3'. In this case, the axis X1' is the same as the axis X1. Retardation modulation is performed by inputting light in a manner of being parallel or perpendicular to these new axes, that is, the axes X2' and X3'. In FIG. 2, an electric field is applied to an electro-optic crystal 1104 such that an applying direction 1102 is parallel to the axis X3' and perpendicular to the axis X2'. A propagation direction 1101 of the input light L1 is parallel to the applying direction 1102 of an electric field. In this case, Kerr coefficients used for modulating the input light L1 are g11, g12 and g44. In the above description, the terms "rotation center", "horizontal", and "perpendicular" not only indicate a positional relationship in a strict sense but can also include an error or the like in a manufacturing process.

In the present embodiment, for example, the electro-optic crystal 1104 to be used for retardation modulation may be obtained by cutting an electro-optic crystal 1103 subjected to crystal growth based on the axes X1, X2, and X3 along the axes X1, X2', and X3'. That is, in the wavelength plate 100, the electro-optic crystal 101 has a structure similar to that of the electro-optic crystal 1104. As illustrated in FIG. 1, the input surface 101*a* and the rear surface 101*b* of the electro-optic crystal 101 are located along the axis X2'. More specifically, the input surface 101*a* and the rear surface 101*b* are planes including both the axis X1 and the axis X2'.

The relative permittivity of a KTN crystal is likely to be affected by the temperature. For example, the relative permittivity is a maximum at approximately 20,000 at a temperature near −5° C., and the relative permittivity decreases to approximately 5,000 at a normal temperature which is close to 20° C. Therefore, for example, the electro-optic crystal 101 may be controlled such that it is a temperature near −5° C. by a temperature control element such as a Peltier element.

The first electrode 103 includes a transparent electrode 103*a* which is disposed on the input surface 101*a* of the electro-optic crystal 101. For example, the transparent electrode 103*a* is formed of ITO (indium tin oxide) and allows the input light L1 to be transmitted through. That is, the input light L1 is transmitted through the transparent electrode 103*a* and is input to the inside of the electro-optic crystal 101. The input light L1 is propagated along the axis X3'. In the present embodiment, the transparent electrode 103*a* is formed over the entire input surface 101*a*. For example, the transparent electrode 103*a* may be formed by depositing ITO on the input surface 101*a* of the electro-optic crystal 101.

The second electrode 105 includes a transparent electrode 105*a* which is disposed on the rear surface 101*b* of the electro-optic crystal 101. For example, similar to the transparent electrode 103*a*, the transparent electrode 105*a* is formed of ITO and allows the input light Li to be transmitted through. That is, the input light L1, which has been input to the inside of the electro-optic crystal 101 and has been subjected to retardation modulation, can be output from the transparent electrode 105*a* as modulated light (output light) L2. In the present embodiment, the transparent electrode 105*a* is formed over the entire rear surface 101*b*. For example, the transparent electrode 105*a* may be formed by depositing ITO on the rear surface 101*b* of the electro-optic crystal 101.

The drive circuit 107 is electrically connected to the transparent electrode 103*a* and the transparent electrode 105*a* and applies an electric field to a part between the transparent electrode 103*a* and the transparent electrode 105*a*. For example, the magnitude of a voltage to be applied by the drive circuit 107 can be controlled in accordance with the wavelength or the like of input light.

When an applied electric field is zero, a KTN crystal is an isotropic crystal having one refractive index $n_k$. When an electric field E is applied to the KTN crystal, the KTN crystal manifests birefringence due to the Kerr effect. That is, input light is divided into two linear polarization components of which vibration directions of optical electric field vectors are orthogonal to each other, and is propagated inside the crystal. Linearly polarized light vibrating along the X1-axis direction is affected by a sum $n_k + \Delta n_1$ of the refractive index $n_k$ and the refractive index $\Delta n_1$ obtained by Expression (3) and induced by the applied electric field E.

[Math. 3]

$$\Delta n_1 = -\frac{n_k^3}{2} g_{12}[\varepsilon_0(\varepsilon_r - 1)]^2 E^2 \qquad (3)$$

Here, g12 is the Kerr coefficient (unit: $m^4/C^2$) of a KTN crystal, $\varepsilon_0$ is the vacuum dielectric constant, and $\varepsilon_r$ is the relative permittivity of the KTN crystal. On the other hand, linearly polarized light vibrating along the X2'-axis direction is affected by a sum $n_k + \Delta n_2$ of $n_k$ and the refractive index $\Delta n_2$ given by Expression (4) and induced by the applied electric field E.

[Math. 4]

$$\Delta n_2 = -\frac{n_k^3}{4}(g_{11} + g_{12} - g_{44})[\varepsilon_0(\varepsilon_r - 1)]^2 E^2 \qquad (4)$$

Here, g11 and g44 are the Kerr coefficients (unit: $m^4/C^2$) of the KTN crystal. In this case, a phase difference (retardation) $\theta_k$ between two linear polarization components of the input light L1 orthogonal to each other is obtained by the following Expression (5). Here, $L_k$ indicates the thickness of the KTN crystal in the X3'-axis direction, and V indicates a voltage applied to the crystal.

[Math. 5]

$$\theta_k = -\frac{\pi n_k^3}{2\lambda}[\varepsilon_0(\varepsilon_r - 1)]^2(g_{11} - g_{12} - g_{44})\frac{V^2}{L_k} \qquad (5)$$

Based on Expression (5), when applied voltages necessary for a quarter-wave plate and a ½ wavelength plate are $V_{\lambda/4}$ and $V_{\lambda/2}$ respectively, these applied voltages are given by Expression (6) and Expression (7).

[Math. 6]

$$V_{\lambda/4} = \frac{1}{\varepsilon_0(\varepsilon_r - 1)}\sqrt{\frac{\lambda L_k}{n_k^3(g_{11} - g_{12} - g_{44})}} \qquad (6)$$

[Math. 7]

$$V_{\lambda/2} = \frac{1}{\varepsilon_0(\varepsilon_r - 1)}\sqrt{\frac{2\lambda L_k}{n_k^3(g_{11} - g_{12} - g_{44})}} \qquad (7)$$

FIG. 3 illustrates a relationship between the applied voltages $V_{\lambda/4}$ and $V_{\lambda/2}$, which are obtained by substituting various factors of a KTN crystal into Expression (6) and Expression (7), and the wavelength $\lambda$.

In the example of FIG. 3, the relative permittivity $\varepsilon_r$ is set to 10,000, the thickness $L_k$ of a KTN crystal is set to 100 μm. As illustrated in FIG. 3, the wavelength plate 100 may be utilized as the quarter-wave plate and the ½ wavelength plate over a wide wavelength range by changing the applying voltage. In addition, although there is one wavelength plate, it may be utilized as the quarter-wave plate and the ½ wavelength plate by applying a predetermined voltage. For example, as indicated with dotted lines in FIG. 3, when a voltage $V_x$ is applied, the wavelength plate may be utilized as the quarter-wave plate in the wavelength λ1 and may be utilized as the ½ wavelength plate in the wavelength λ2.

As described above, in the wavelength plate 100 according to the present embodiment, two arbitrary axes are rotated about the remaining crystal axis at an arbitrary angle in the electro-optic crystal 101 that is an isotropic crystal which belongs to the point group m3m of the cubic system. Since the input surface 101a is located along at least one axis between the two arbitrary axes, the input light Li is input in a manner of being parallel or perpendicular to the two arbitrary axes.

Moreover, a direction of an electric field to be induced by a voltage applied to a part between the first electrode 103 and the second electrode 105 is set in the propagation direction of the input light Li inside the electro-optic crystal 101. Consequently, retardation modulation utilizing the Kerr effect can be performed, so that the modulated light L2 subjected to retardation modulation can be output.

In addition, the rotation angle of the crystal axes in the electro-optic crystal 101 may be an angle within a range of 40 degrees to 50 degrees. Particularly, the predetermined angle may be 45 degrees. Since the rotation angle of the crystal axes is within a range of 40 degrees to 50 degrees, which is close to 45 degrees, modulation is efficiently performed.

In the related art, a phase difference $\theta_s$ of light passing through a wavelength plate is given by Expression (8). Here, λ indicates a wavelength of light, $\Delta n_s$ is the difference between the ordinary ray refractive index and the extraordinary ray refractive index of a wavelength plate, and $d_s$ is the thickness of the wavelength plate in an optical axis direction.

[Math. 8]

$$\theta_s = \frac{2\pi}{\lambda} \Delta n_s d_s \qquad (8)$$

Such a wavelength plate in the related art has problems, for example, a crystal has to be processed with extremely high accuracy, only one wavelength can be used in one wavelength plate, and the wavelength plate is a passive element and has poor functionality. In regard to these problems, particularly related to the processing accuracy, for example, in the quarter-wave plate, processing needs to be performed such that the following Expression (9) is established.

[Math. 9]

$$\theta_s = \frac{\pi}{2} + 2m\pi \qquad (9)$$

Here, m indicates a non-negative integer. For example, when a thickness d, of the wavelength plate having $\Delta n_s$=0.01 and λ=632.8 nm is set to approximately 4 mm, m=62 is achieved based on the above 2 Expressions. In this case, the thickness $d_s$ of the wavelength plate becomes 3.9392 mm, so that it is ascertained that the wavelength plate needs to be processed with high accuracy, such as λ/6.33 (100 nm order).

Here, an errorless thickness of the wavelength plate in the related art is $d_0$. Moreover, when the thickness of a wavelength plate including a thickness error $\Delta d_s$ is $d_s$, $d_s$ is expressed by Expression (10).

[Math. 10]

$$d_s = d_0 + \Delta d_s \qquad (10)$$

In this case, a relational expression of the thickness error Δds in the wavelength plate in the related art and the phase difference error θs due to the thickness error Δds is expressed by Expression (11).

[Math. 11]

$$\Delta\theta_s = \left(\frac{\pi}{2} + 2m\pi\right)\frac{\Delta d_s}{d_0} \qquad (11)$$

On the other hand, in the wavelength plate 100 of the present embodiment, an errorless thickness of a KTN crystal is $L_o$, and a phase difference at that time is $\theta_{k0}$. Moreover, when the thickness of the wavelength plate including a thickness error $\Delta d_k$ is $\Delta L_k$, $\Delta L_k$ is expressed by Expression (12).

[Math. 12]

$$L_k = L_0 + \Delta L_k \qquad (12)$$

Here, when an error of the phase difference due to the thickness error $\Delta d_k$ is $\Delta\theta_k$ and an applying voltage causing $\theta_{k0}$ to be π/2 is $V_{\pi/2}$, the following Expression (13) is obtained based on Expression (5) and Expression (12).

[Math. 13]

$$\Delta\theta_k = \frac{\pi}{2}\frac{\Delta L_k}{L_0} \qquad (13)$$

With reference to Expression (11) and Expression (13), on the assumption that the wavelength plate in the related art and the wavelength plate of the present embodiment have the same phase difference error, the following Expression (14) is established.

[Math. 14]

$$\frac{\Delta L_k}{L_0} = (4m+1)\frac{\Delta d_s}{d_0} \qquad (14)$$

When a permissible processing error is λ/6.33, the permissible processing error of a KTN crystal in the present embodiment becomes approximately 40λ, that is, the permissible processing error increases significantly.

In this manner, in the present embodiment, the performance of the wavelength plate is dramatically improved. In the wavelength plate in the related art, the parallelism between input and output end surfaces for light and the absolute value for the plate thickness have to be ensured at the same time. In contrast, the wavelength plate of the present embodiment need only ensure the parallelism between the input and output end surfaces.

Second Embodiment

Figure 4:
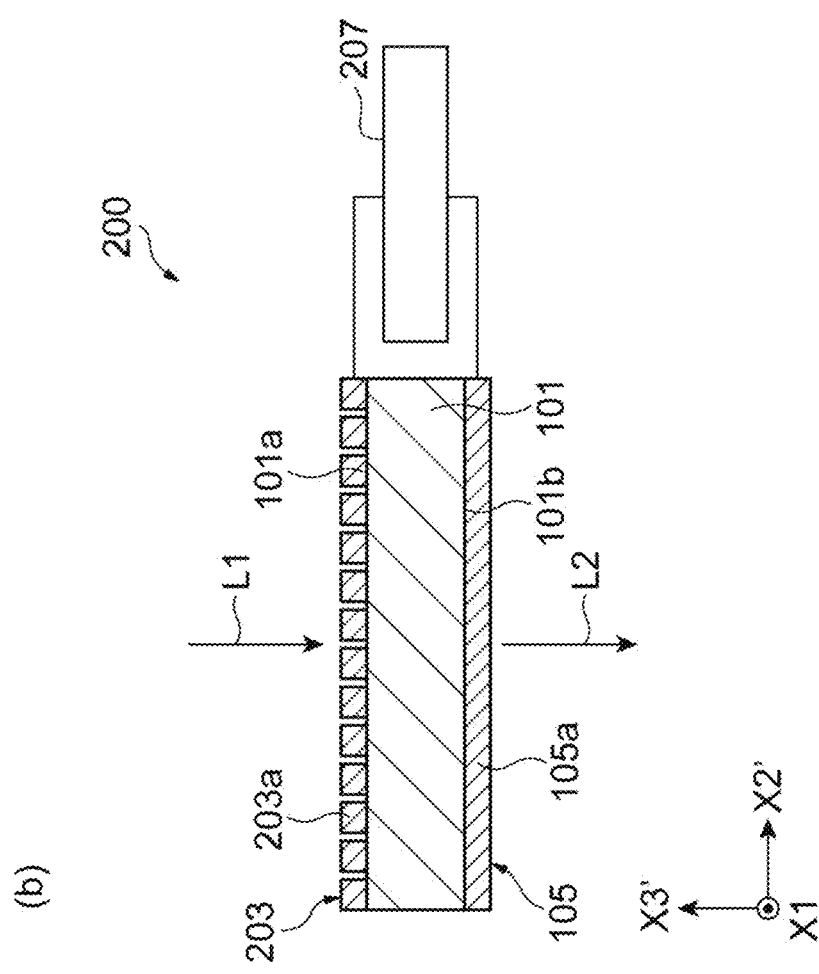
FIG. 4 is a schematic view illustrating a wavelength plate according to another embodiment.

In the present embodiment, as an example of an optical element, another wavelength plate will be described. FIG. 4(a) is a perspective view schematically illustrating a wavelength plate. FIG. 4(b) is a cross-sectional view schematically illustrating the wavelength plate. A wavelength plate 200 includes the electro-optic crystal 101, a first electrode 203, the second electrode 105, and a drive circuit 207. Since the configurations of the electro-optic crystal 101 and the second electrode 105 are similar to those of the first embodiment, description thereof will be omitted.

The first electrode 203 includes a plurality of transparent electrodes 203a which is disposed on the input surface 101a of the electro-optic crystal 101. For example, the transparent electrodes 203a are formed of ITO and allow the input light L1 to be transmitted through. That is, the input light L1 is transmitted through the transparent electrodes 203a and is input to the inside of the electro-optic crystal 101. In the present embodiment, the plurality of transparent electrodes 203a is formed in a two-dimensional array shape with respect to the input surface 101a. The space between the transparent electrodes 203a adjacent to each other is set to a distance shorter than a postulated wavelength of the input light L1. For example, the transparent electrodes 203a may be formed by depositing ITO on the input surface 101a of the electro-optic crystal 101.

The drive circuit 207 is electrically connected to the first electrode 203 and the second electrode 105 and applies an electric field to a part between the first electrode 203 and the second electrode 105. In the present embodiment, an electric field is applied to a part between each of the plurality of transparent electrodes 203a and the transparent electrode 105a. For example, the magnitude of an electric field to be applied by the drive circuit 207 may be controlled for each of the plurality of transparent electrodes 203a. The second electrode 105 disposed on the rear surface 101b of the electro-optic crystal 101 may include a plurality of transparent electrodes, the first electrode 203 may be formed over the entire input surface 101a.

Third Embodiment

In the present embodiment, as an example of an optical element, further another wavelength plate will be described. FIG. 5(a) is a perspective view schematically illustrating a wavelength plate. FIG. 5(b) is a cross-sectional view schematically illustrating the wavelength plate. A wavelength plate 300 includes the electro-optic crystal 101, the first electrode 103, a second electrode 305, and the drive circuit 107. Since the configurations of the electro-optic crystal 101, the first electrode 103, and the drive circuit 107 are similar to those of the first embodiment, description thereof will be omitted.

The second electrode 305 includes a reflecting electrode 305a which is disposed on the rear surface 101b of the electro-optic crystal 101. The reflecting electrode 305a can reflect the input light L1, which is propagated inside the electro-optic crystal 101, toward the input surface 101a. That is, the input light L1, which has been input to the inside of the electro-optic crystal 101 and has been subjected to retardation modulation, is reflected by the reflecting electrode 305a on the rear surface 101b of the electro-optic crystal 101 and can be output from the first electrode 103 as the modulated light L2. For example, the reflecting electrode 305a is formed of a material such as a metal (for example, aluminum). In the present embodiment, the reflecting electrode 305a is formed over the entire rear surface 101b.

Fourth Embodiment

In the present embodiment, as an example of an optical element, still another wavelength plate will be described.

FIG. 6(a) is a perspective view schematically illustrating a wavelength plate. FIG. 6(b) is a cross-sectional view schematically illustrating the wavelength plate. A wavelength plate 400 includes the electro-optic crystal 101, the first electrode 103, a second electrode 405, and the drive circuit 107. Since the configurations of the electro-optic crystal 101, the first electrode 103, and the drive circuit 107 are similar to those of the first embodiment, description thereof will be omitted.

The second electrode 405 includes a transparent electrode 405a and a reflecting portion 405b which are disposed on the rear surface 101b of the electro-optic crystal 101. For example, the transparent electrode 405a is formed of ITO and allows the input light Li to be transmitted through. That is, the input light L1, which has been input to the inside of the electro-optic crystal 101 and has been subjected to retardation modulation, can be output from the transparent electrode 405a as the modulated light L2. In the present embodiment, the transparent electrode 405a is formed over the entire rear surface 101b. For example, the transparent electrode 405a may be formed by depositing ITO on the rear surface 101b of the electro-optic crystal 101.

The reflecting portion 405b can reflect the modulated light L2, which is output from the transparent electrode 405a, toward the input surface 101a. That is, the modulated light L2 is reflected by the reflecting portion 405b, is propagated in the transparent electrode 405a and the electro-optic crystal 101, and can be output from the first electrode 103. For example, the reflecting portion 405b may be a dielectric multilayer which can efficiently reflect light. The dielectric multilayer reflects the modulated light L2, which has been transmitted through the transparent electrode 405a, toward the first electrode 103 formed on the input surface 101a. For example, the dielectric multilayer may be formed by depositing a material, such as a substance having a high refractive index ($Ta_2O_5$) or a substance having a low refractive index ($SiO_2$), on a surface of the transparent electrode 405a.

In the present embodiment, the reflecting portion 405b is formed over the entire surface of the transparent electrode 405a. In the present embodiment, the transparent electrode 405a is provided between the electro-optic crystal 101 and the reflecting portion 405b. However, the reflecting portion 405b may be provided between the electro-optic crystal 101 and the transparent electrode 405a.

Fifth Embodiment

Figure 7:
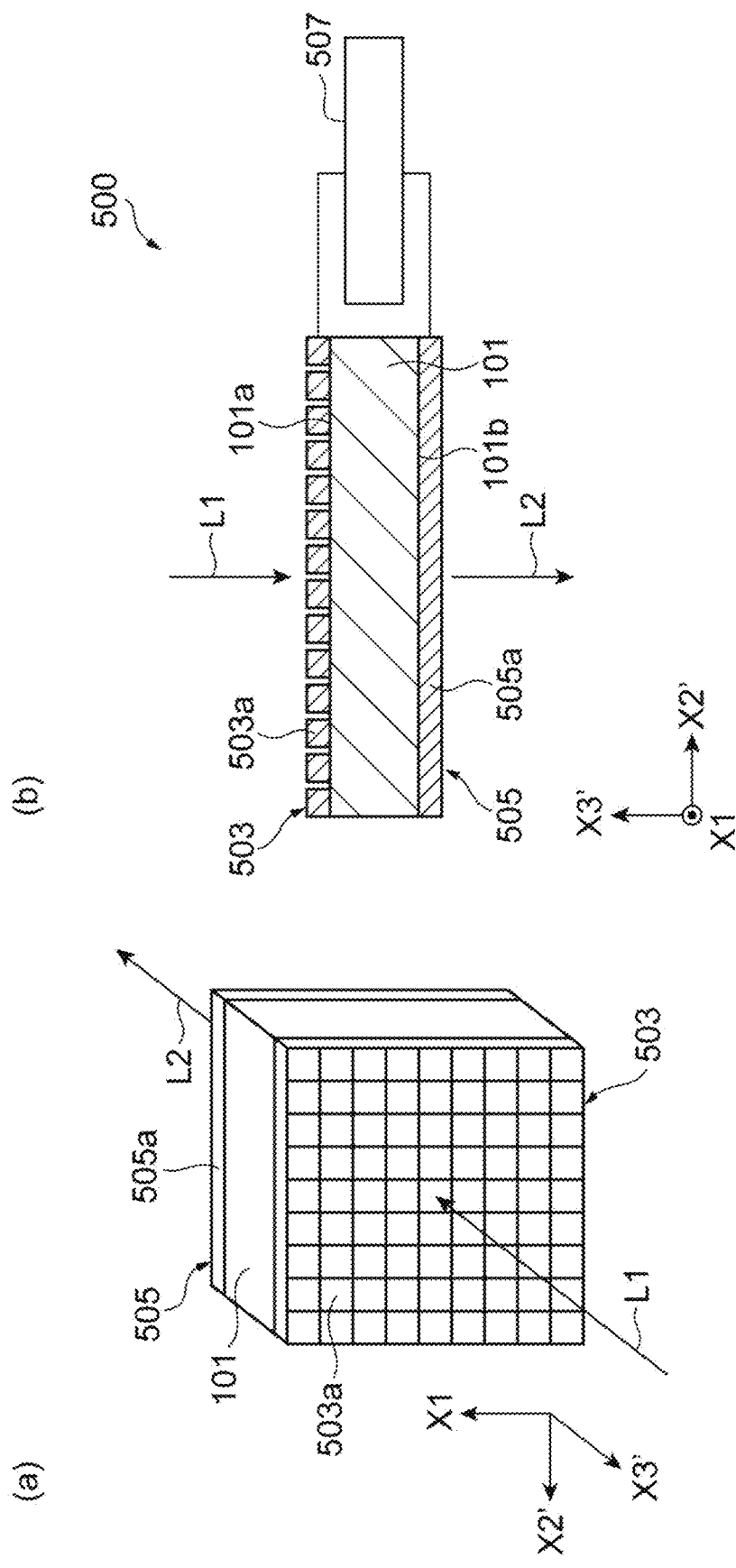
FIG. 7 is a schematic view illustrating a spatial light modulator according to an embodiment.

In the present embodiment, as an example of an optical element, a spatial light modulator (type of a light modulator) will be described. FIG. 7(a) is a perspective view schematically illustrating a spatial light modulator. FIG. 7(b) is a cross-sectional view schematically illustrating the spatial light modulator. A spatial light modulator 500 includes the electro-optic crystal 101, a first electrode 503, a second electrode 505, and a drive circuit 507. Since the configurations of the electro-optic crystal 101 are similar to those of the first embodiment, description thereof will be omitted.

The first electrode 503 includes a plurality of transparent electrodes 503a which is disposed on the input surface 101a of the electro-optic crystal 101. For example, the transparent electrodes 503a are formed of ITO and allow the input light L1 to be transmitted through. That is, the input light L1 is transmitted through the transparent electrodes 503a and is input to the inside of the electro-optic crystal 101. The input light L1 is propagated along the axis X3'. In the present embodiment, the plurality of transparent electrodes 503a is formed in a two-dimensional array shape with respect to the input surface 101a. The space between the transparent electrodes 503a adjacent to each other is set to a distance shorter than a postulated wavelength of the input light L1. For example, the transparent electrodes 503a may be formed by depositing ITO on the input surface 101a of the electro-optic crystal 101.

The second electrode 505 includes a transparent electrode 505a which is disposed on the rear surface 101b of the electro-optic crystal 101. Similar to the transparent electrodes 503a, for example, the transparent electrode 505a is formed of ITO and allows the input light L1 to be transmitted through. That is, the input light L1, which has been input to the inside of the electro-optic crystal 101 and has been subjected to retardation modulation, may be output from the transparent electrode 505a as the modulated light L2. In the present embodiment, the transparent electrode 505a is formed over the entire rear surface 101b. For example, the transparent electrode 505a may be formed by depositing ITO on the rear surface 101b of the electro-optic crystal 101.

The drive circuit 507 is electrically connected to the first electrode 503 and the second electrode 505 and applies an electric field to a part between the first electrode 503 and the second electrode 505. In the present embodiment, an electric field is applied to a part between each of the plurality of transparent electrodes 503a and the transparent electrode 505a. For example, the magnitude of a voltage applied by the drive circuit 507 may be controlled for each of the plurality of transparent electrodes 503a. In the present embodiment, as a light modulator, a spatial light modulator having a multi-pixel structure is illustrated. However, a light modulator having a single-pixel structure may be employed.

Sixth Embodiment

In the present embodiment, as an example of an optical element, another spatial light modulator will be described. FIG. 8(a) is a perspective view schematically illustrating a spatial light modulator. FIG. 8(b) is a cross-sectional view schematically illustrating the spatial light modulator. A spatial light modulator 600 includes the electro-optic crystal 101, the first electrode 503, a second electrode 605, and the drive circuit 507. Since the configuration of the electro-optic crystal 101, the first electrode 503, and the drive circuit 507 are similar to those of the fifth embodiment, description thereof will be omitted.

The second electrode 605 includes a reflecting electrode 605a which is disposed on the rear surface 101b of the electro-optic crystal 101. The reflecting electrode 605a can reflect the input light L1, which is propagated inside the electro-optic crystal 101, toward the input surface 101a. That is, the input light LI, which has been input to the inside of the electro-optic crystal 101 and has been subjected to retardation modulation, is reflected by the reflecting electrode 605a on the rear surface 101b of the electro-optic crystal 101 and can be output from the first electrode 503 as the modulated light L2. For example, the reflecting electrode 605a is formed of a material such as a metal (for example, aluminum). In the present embodiment, the reflecting electrode 605a is formed over the entire rear surface 101b. In the present embodiment, as a light modulator, a spatial light modulator having a multi-pixel structure is illustrated. However, a light modulator having a single-pixel structure may be employed.

Seventh Embodiment

In the present embodiment, as an example of an optical element, further another spatial light modulator will be described. FIG. 9(a) is a perspective view schematically illustrating a spatial light modulator. FIG. 9(b) is a cross-sectional view schematically illustrating the spatial light modulator. A spatial light modulator 700 includes the electro-optic crystal 101, the first electrode 503, a second electrode 705, and the drive circuit 507. Since the configuration of the electro-optic crystal 101, the first electrode 503, and the drive circuit 507 are similar to those of the fifth embodiment, description thereof will be omitted.

The second electrode 705 includes a transparent electrode 705a and a reflecting portion 705b which are disposed on the rear surface 101b of the electro-optic crystal 101. For example, the transparent electrode 705a is formed of ITO and allows the input light Li to be transmitted through. That is, the input light L1, which has been input to the inside of the electro-optic crystal 101 and has been subjected to retardation modulation, can be output from the transparent electrode 705a as the modulated light L2. In the present embodiment, the transparent electrode 705a is formed over the entire rear surface 101b. For example, the transparent electrode 705a may be formed by depositing ITO on the rear surface 101b of the electro-optic crystal 101.

The reflecting portion 705b can reflect the modulated light L2, which has been output from the transparent electrode 705a, toward the input surface 101a. That is, the modulated light L2 is reflected by the reflecting portion 705b, is propagated in the transparent electrode 705a and the electro-optic crystal 101, and can be output from the first electrode 503. For example, the reflecting portion 705b may be a dielectric multilayer which can efficiently reflect light. The dielectric multilayer reflects the modulated light L2, which has been transmitted through the transparent electrode 705a, toward the first electrode 503 formed on the input surface 101a. For example, the dielectric multilayer may be fowled by depositing a material, such as a substance having a high refractive index ($Ta_2O_5$) or a substance having a low refractive index ($SiO_2$), on a surface of the transparent electrode 705a. In the present embodiment, the reflecting portion 705b is formed over the entire surface of the transparent electrode 705a. In the present embodiment, as a light modulator, a spatial light modulator having a multi-pixel structure is illustrated. However, a light modulator having a single-pixel structure may be employed.

Eighth Embodiment

Figure 10:
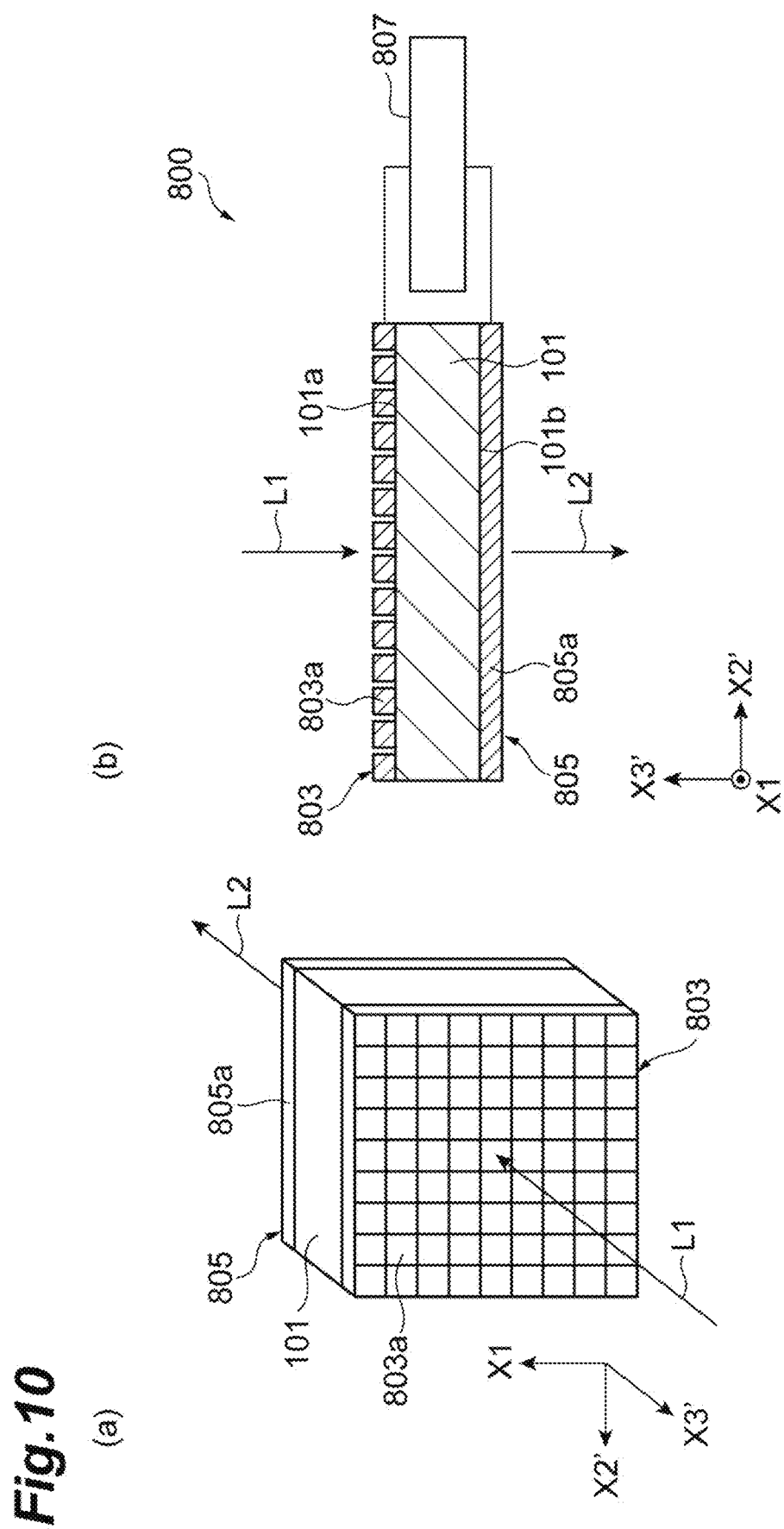
FIG. 10 is a schematic view illustrating a display element according to an embodiment.

In the present embodiment, as an example of an optical element, a display element will be described. FIG. 10(a) is a perspective view schematically illustrating a display element. FIG. 10(b) is a cross-sectional view schematically illustrating the display element. A display element 800 is an element in a display device, such as a projector, modulating light from a light source. The display element 800 includes the electro-optic crystal 101, a first electrode 803, a second electrode 805, and a drive circuit 807. Since the configurations of the electro-optic crystal 101 are similar to those of the first embodiment, description thereof will be omitted.

The first electrode 803 includes a plurality of transparent electrodes 803a which is disposed on the input surface 101a of the electro-optic crystal 101. For example, the transparent electrodes 803a are formed of ITO and allow the input light L1 to be transmitted through. That is, the input light L1 is transmitted through the transparent electrodes 803a and is input to the inside of the electro-optic crystal 101. The input light L1 is propagated along the axis X3'. In the present embodiment, the plurality of transparent electrodes 803a is formed in a two-dimensional array shape with respect to the input surface 101a. The space between the transparent electrodes 803a adjacent to each other is set to a distance shorter than a postulated wavelength of input light. For example, the transparent electrodes 803a may be formed by depositing ITO on the input surface 101a of the electro-optic crystal 101.

The second electrode 805 includes a transparent electrode 805a which is disposed on the rear surface 101b of the electro-optic crystal 101. Similar to the transparent electrodes 803a, for example, the transparent electrode 805a is formed of ITO and allows the input light L1 to be transmitted through. That is, the input light L1, which has been input to the inside of the electro-optic crystal 101 and has been subjected to retardation modulation, can be output from the transparent electrode 805a as the modulated light L2. In the present embodiment, the transparent electrode 805a is formed over the entire rear surface 101b. For example, the transparent electrode 805a may be formed by depositing ITO on the rear surface 101b of the electro-optic crystal 101.

The drive circuit 807 is electrically connected to the first electrode 803 and the second electrode 805 and applies an electric field to a part between the first electrode 803 and the second electrode 805. In the present embodiment, an electric field is applied between each of the plurality of transparent electrodes 803a and the transparent electrode 805a. For example, the magnitude of an electric field to be applied by the drive circuit 807 may be controlled for each of the plurality of transparent electrodes 803a.

Ninth Embodiment

Figure 11:
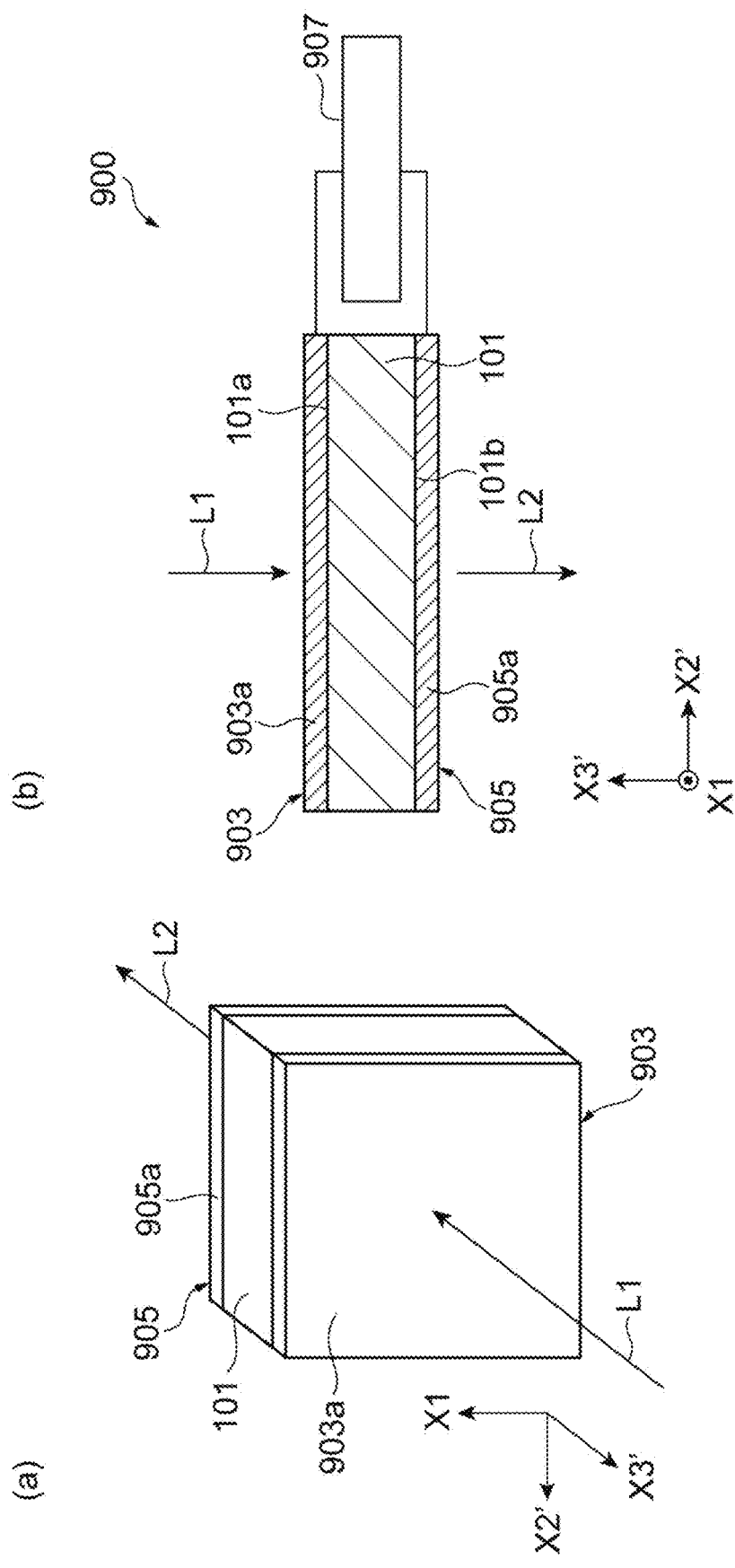
FIG. 11 is a schematic view illustrating a compensator according to an embodiment.

In the present embodiment, as an example of an optical element, a compensator will be described. FIG. 11(a) is a perspective view schematically illustrating a compensator. FIG. 11(b) is a cross-sectional view schematically illustrating the compensator. The compensator is a variable retardation plate which can be utilized in a manner similar to a Babinet-Soleil's compensator. The compensator includes the electro-optic crystal 101, a first electrode 903, a second electrode 905, and a drive circuit 907. Since the configuration of the electro-optic crystal 101 is similar to that of the first embodiment, description thereof will be omitted.

The first electrode 903 includes a transparent electrode 903a which is disposed on the input surface 101a of the electro-optic crystal 101. For example, the transparent electrode 903a is formed of ITO and allows the input light L1 to be transmitted through. That is, the input light Li is transmitted through the transparent electrode 903a and is input to the inside of the electro-optic crystal 101. The input light L1 is propagated along the axis X3'. In the present embodiment, the transparent electrode 903a is formed over the entire input surface 101a. For example, the transparent electrode 903a may be formed by depositing ITO on the input surface 101a of the electro-optic crystal 101.

The second electrode 905 includes a transparent electrode 905b which is disposed on the rear surface 101b of the electro-optic crystal 101. Similar to the transparent electrode 903a, for example, the transparent electrode 905b is formed of ITO and allows the input light L1 to be transmitted through. That is, the input light L1, which has been input to the inside of the electro-optic crystal 101 and has been subjected to retardation modulation, can be output from the transparent electrode 905a as the modulated light L2. In the present embodiment, the transparent electrode 905a is formed over the entire rear surface 101b. For example, the transparent electrode 905a may be formed by depositing ITO on the rear surface 101b of the electro-optic crystal 101.

the drive circuit 907 is electrically connected to the transparent electrode 903a and the transparent electrode 905a and applies an electric field to a part between the transparent electrode 903a and the transparent electrode 905a. Retardation of the input light L1 can be controlled by the drive circuit 907 controlling the magnitude of an electric field to be applied.

The compensator of the present embodiment has no mechanically movable parts as in a Babinet-Soleil's compensator. Therefore, highly accurate measurements can be performed at a high speed.

Tenth Embodiment

Figure 12:
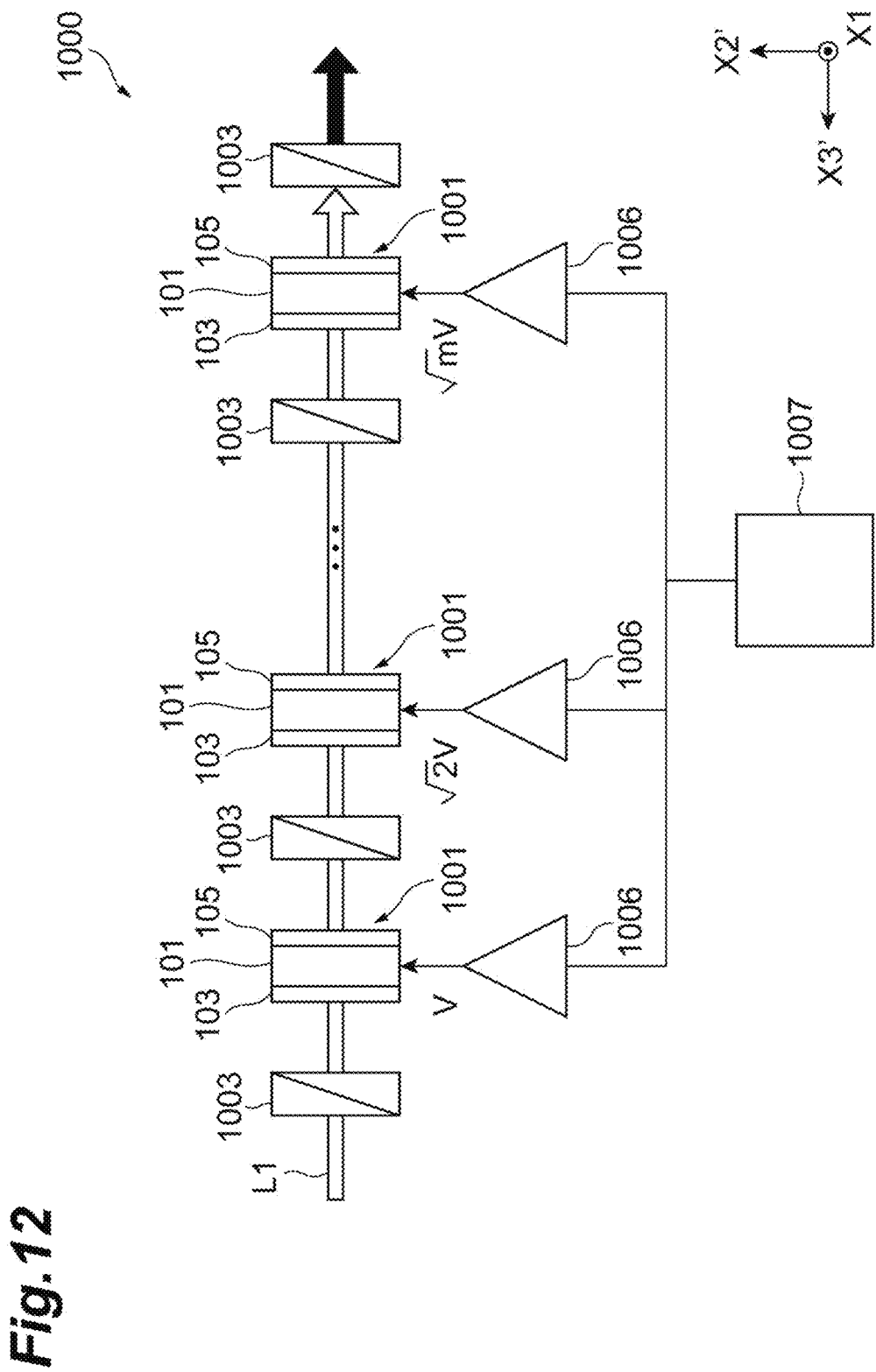
FIG. 12 is a schematic view illustrating an optical filter according to an embodiment.

In the present embodiment, as an example of an optical device, an optical filter including an optical element will be described. FIG. 12 is a view schematically illustrating a configuration of an optical filter. An optical filter 1000 includes a plurality of optical elements 1001, a plurality of polarizers 1003, and a drive circuit 1007. For example, the optical elements 1001 have a configuration which is substantially the same as that of the wavelength plate 100 in the first embodiment. The optical element 1001 includes the electro-optic crystal 101, the first electrode 103, and the second electrode 105.

The plurality of optical elements 1001 is arrayed on an optical path of the input light L1. The plurality of polarizers 1003 is disposed on each of the first electrode 103 side and the second electrode 105 side of the plurality of optical elements 1001. That is, the plurality of optical elements 1001 and the plurality of polarizers 1003 are alternately arrayed. In other words, pairs of the polarizer 1003 and the optical element 1001 are arrayed in a plurality of stages. The polarizers 1003 are disposed at an input end and an output end for light.

The drive circuit 1007 is electrically connected to each of the optical elements 1001 via an amplifier 1006. The drive circuit 1007 applies an electric field to a part between the first electrode 103 and the second electrode 105 with respect to each of the plurality of optical elements 1001. When the number of stages from the input end side is m, an amplitude V of a voltage applied to the optical element 1001 disposed in the mth stage is expressed by the following Expression (15). The factor $V_0$ is an amplitude of a voltage applied to the optical element 1001 in the first stage. When an applying voltage is controlled in this manner, the optical filter of the present embodiment can accomplish a function similar to that of a LYOT filter in the related art.

[Math. 15]

$$V = \sqrt{m} V_0 \quad (15)$$

Hereinabove, the embodiments have been described in detail with reference to the drawings. However, the specific configuration is not limited to these embodiments.

An example, in which the input surface is set to be parallel to the axis X2' of the crystal axes of the electro-optic crystal rotated about the axis X1 used as a rotation center, has been described. However, the embodiments are not limited thereto. For example, the axis X2 or the axis X3 may be used as the rotation center. In addition, when the axis X1 is used as the rotation center, a plane parallel to the axis X3' may serve as the input surface. Moreover, for example, when the axis X1 is used as the rotation center, each of a surface along the axis X2' and a surface along the axis X3' may serve as the input surface. In this case, a first electrode may be disposed on one surface along the axis X2', and a second electrode may be disposed on the other surface along the axis X2'. Moreover, another first electrode may be disposed on one surface along the axis X3', and another second electrode may be disposed on the other surface along the axis X3'.

REFERENCE SIGNS LIST

100 Wavelength plate
101 (1104) Electro-optic crystal
101a Input surface
101b Rear surface
103 First electrode
L1 Input light
L2 Modulated light
X1, X2, and X3 Axis (crystal axis)
X1', X2', and X3' Axis

The invention claimed is:

1. An optical element for controlling retardation of linear polarization components in input light orthogonal to each other, the optical element comprising:
    an electro-optic crystal having an isotropic crystal which belongs to a point group m3m of a cubic system and including an input surface to which the input light is input and a rear surface which is a surface on an opposite side of the input surface;
    a first electrode disposed on the input surface; and
    a second electrode disposed on the rear surface,
    wherein the input surface is located along a crystal axis as a rotation center in three crystal axes of the electro-optic crystal and one axis between axes obtained by rotating only two remaining crystal axes about the rotation center at an angle from between 40 degrees to 50 degrees, and
    wherein a direction of an electric field to be induced by a voltage applied to a part between the first electrode and the second electrode is set in a propagation direction of the input light inside the electro-optic crystal.

2. The optical element according to claim 1, wherein the angle is 45 degrees.

3. The optical element according to claim 1, wherein the electro-optic crystal is a crystal of $KTa_{1-x}Nb_xO_3$ ($0 \le x \le 1$) or a crystal of $K_{1-y}Li_yTa_{1-x}Nb_xO_3$ ($0 \le x \le 1$ and $0 < y < 1$).

4. The optical element according to claim 1, wherein the optical element is a wavelength plate further including a drive circuit configured to apply an electric field to a part between the first electrode and the second electrode.

5. The optical element according to claim 1, wherein the optical element is a light modulator further including a drive circuit configured to apply an electric field to a part between the first electrode and the second electrode.

6. The optical element according to claim 5, wherein the light modulator is a spatial light modulator.

7. The optical element according to claim 1, wherein the optical element is a display element further including a drive circuit configured to apply an electric field to a part between the first electrode and the second electrode.

8. The optical element according to claim 1, wherein the optical element is a compensator further including a drive circuit configured to apply an electric field to a part between the first electrode and the second electrode.

9. An optical device which includes a plurality of optical elements according to claim 1 and in which the plurality of optical elements is arrayed on an optical path of the input light, the optical device comprising:
    a drive circuit configured to apply an electric field to a part between the first electrode and the second electrode with respect to each of the plurality of optical elements; and
    a plurality of polarizers disposed on each of the input surface side and the rear surface side of the plurality of optical elements.

* * * * *